United States Patent
Signorini et al.

(10) Patent No.: US 11,568,083 B2
(45) Date of Patent: Jan. 31, 2023

(54) USER-CONTROLLED ACCESS TO DATA IN A COMMUNICATION NETWORK

(71) Applicant: NOKIA TECHNOLOGIES OY, Espoo (FI)

(72) Inventors: Matteo Signorini, Palaiseau (FR); Dimitrios Schoinianakis, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 230 days.

(21) Appl. No.: 16/942,993

(22) Filed: Jul. 30, 2020

(65) Prior Publication Data
US 2021/0034779 A1 Feb. 4, 2021

(30) Foreign Application Priority Data
Jul. 31, 2019 (EP) ................................. 19189322

(51) Int. Cl.
*G06F 21/62* (2013.01)
*G06F 21/60* (2013.01)
*H04L 9/32* (2006.01)

(52) U.S. Cl.
CPC ........ *G06F 21/6245* (2013.01); *G06F 21/602* (2013.01); *H04L 9/3247* (2013.01)

(58) Field of Classification Search
CPC .. G06F 21/6245; G06F 21/602; G06F 21/604; H04L 9/3247; H04L 2209/38; H04L 9/085; H04L 9/3239; H04L 63/062; H04L 63/083; H04L 67/1097; H04L 63/10
See application file for complete search history.

(56) References Cited

U.S. PATENT DOCUMENTS

| | | | |
|---|---|---|---|
| 2016/0321654 A1 | 11/2016 | Lesavich et al. | |
| 2018/0307859 A1 | 10/2018 | LaFever et al. | |
| 2018/0307868 A1 | 10/2018 | Rettaroli et al. | |
| 2019/0036678 A1 | 1/2019 | Ahmed et al. | |
| 2019/0238535 A1* | 8/2019 | Lew | G10L 17/04 |
| 2019/0354693 A1* | 11/2019 | Yoon | H04L 9/30 |
| 2019/0370866 A1* | 12/2019 | Lawbaugh | G06Q 30/0254 |
| 2019/0384932 A1* | 12/2019 | Pratt | H04L 63/107 |
| 2020/0174968 A1* | 6/2020 | Sreedhar | G06F 21/6254 |
| 2020/0184470 A1* | 6/2020 | Singh | H04L 9/3236 |
| 2020/0226285 A1* | 7/2020 | Bulleit | G16H 40/67 |
| 2020/0394154 A1* | 12/2020 | Blackshear | H04L 9/50 |
| 2021/0073806 A1* | 3/2021 | Wilkinson | H04L 9/50 |
| 2021/0176042 A1* | 6/2021 | Brehmer | H04L 9/14 |
| 2021/0409192 A1* | 12/2021 | Gollogly | H04L 63/0807 |

FOREIGN PATENT DOCUMENTS

WO WO 2019/067989 A1 4/2019

OTHER PUBLICATIONS

Wang et al., *A Blockchain-Based Framework for Data Sharing with Fine-Grained Access Control in Decentralized Storage Systems*, IEEE Access, vol. 6 (Jul. 30, 2018) pp. 38437-38450.

* cited by examiner

*Primary Examiner* — Matthew Smithers
(74) *Attorney, Agent, or Firm* — Alston & Bird LLP (57) ABSTRACT

There is provided a method comprising, receiving, from a second network node, a request to access data of a user of a user device, forwarding the request to the user device, receiving, from the user device, an acknowledgement indicating that access to the data of the user is granted and transmitting, in response to receiving the acknowledgement, a first indication to a blockchain, the first indication indicating that access to the data of the user is granted.

15 Claims, 5 Drawing Sheets

USER-CONTROLLED ACCESS TO DATA IN A COMMUNICATION NETWORK

CROSS-REFERENCE TO RELATED APPLICATIONS

This application claims priority to European Application No. 19189322.1, filed Jul. 31, 2019, the entire contents of which are incorporated herein by reference.

FIELD

Embodiments of the present invention relate in general to communication networks and user-controlled access to data in such networks.

BACKGROUND

Privacy and data confidentiality have always been, and still are, one of the major threats for users of communication networks. Data privacy is extremely important for example in case of social networks, because people may upload sensitive data to a social network and believe that nobody can see said sensitive data except the people that they trust. However, there have been cases wherein sensitive data of a user has been leaked without the permission of the user.

Data privacy is essential for other applications as well. For instance, sensitive data of a user, such as location or billing information, may be known for a cellular operator of the user. Thus, it is essential that the user can control access to such sensitive data as well. There is therefore a need to provide improved methods, apparatuses and computer programs which enable user-controlled access to data in communication networks.

SUMMARY OF THE INVENTION

According to some aspects, there is provided the subject-matter of the independent claims. Some embodiments are defined in the dependent claims. The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect, there is provided a first method for a first network node comprising, receiving, from a second network node, a request to access data of a user of a user device, forwarding the request to the user device, receiving, from the user device, an acknowledgement indicating that access to the data of the user is granted and in response to receiving the acknowledgement, transmitting a first indication to a blockchain, the first indication indicating that access to the data of the user is granted.

According to the first aspect, the first method may further comprise creating a multisignature channel for communicating privately with the user device and the second network node upon receiving the acknowledgement indicating that access to the data of the user is granted.

According to the first aspect, the first method may further comprise transmitting, to the second network node, a first share of a private key associated with an account of the user upon receiving the acknowledgment indicating that access to the data of the user is granted. In addition, the first method may comprise signing a new status of a multisignature channel upon transmitting the first share of the private key, the new status indicating that the first share of the private key associated with the account of the user has been transmitted to the second network node.

According to the first aspect, the first method may further comprise determining that access to the data of the user is terminated and transmitting a second indication to the blockchain, the second indication indicating that access to the data of the user is terminated.

According to a second aspect, there is provided a second method for a user device comprising, receiving, from a second network node via a first network node, a request to access data of a user of the user device, transmitting, to the first network node, an acknowledgement indicating that access to the data of the user is granted and upon transmitting the acknowledgement, transmitting a first indication to a blockchain, the first indication indicating that access to the data of the user is granted.

According to the second aspect, the second method may further comprise creating a multisignature channel for communicating privately with the first network node and the second network node upon transmitting the acknowledgement indicating that access to the data of the user is granted.

According to the second aspect, the second method may further comprise transmitting a second share of a private key to the second network node upon transmitting the acknowledgment indicating that access to the data of the user is granted. The second method may also comprise signing a new status of a multisignature channel upon transmitting the second share of the private key, the new status indicating that the second share of the private key associated with the account of the user has been transmitted to the second network node.

According to the second aspect, the second method may further comprise determining that access to the data of the user is terminated and transmitting a second indication to the blockchain, the second indication indicating that access to the data of the user is terminated.

According to a third aspect of the present invention, there is provided an apparatus comprising at least one processing core, at least one memory including computer program code, at least one memory and the computer program code being configured to, with the at least one processing core, cause the apparatus at least to perform, receive, from a second network node, a request to access data of a user of a user device, forward the request to the user device, receive, from the user device, an acknowledgement indicating that access to the data of the user is granted and in response to receiving the acknowledgement, transmit a first indication to a blockchain, the first indication indicating that access to the data of the user is granted.

According to a fourth aspect of the present invention, there is provided an apparatus comprising at least one processing core, at least one memory including computer program code, at least one memory and the computer program code being configured to, with the at least one processing core, cause the apparatus at least to perform receive, from a second network node via a first network node, a request to access data of a user of the user device, transmit, to the first network node, an acknowledgement indicating that access to the data of the user is granted and upon transmitting the acknowledgement, transmit a first indication to a blockchain, the first indication indicating that access to the data of the user is granted.

According to a fifth aspect of the present invention, there is provided an apparatus comprising means for performing the first method. The apparatus may comprise means for receiving, from a second network node, a request to access data of a user of a user device, means for forwarding the request to the user device, means for receiving, from the user device, an acknowledgement indicating that access to the data of the user is granted and in response to receiving the acknowledgement, means for transmitting a first indication to a blockchain, the first indication indicating that access to the data of the user is granted.

According to a sixth aspect of the present invention, there is provided an apparatus comprising means for performing the first method. The apparatus may comprise means for means for receiving, from a second network node via a first network node, a request to access data of a user of the user device, means for transmitting, to the first network node, an acknowledgement indicating that access to the data of the user is granted and means for transmitting, upon transmitting the acknowledgement, a first indication to a blockchain, the first indication indicating that access to the data of the user is granted.

According to a seventh aspect of the present invention, there is provided non-transitory computer readable medium having stored thereon a set of computer readable instructions that, when executed by at least one processor, cause an apparatus to at least perform the first method.

According to an eighth aspect of the present invention, there is provided non-transitory computer readable medium having stored thereon a set of computer readable instructions that, when executed by at least one processor, cause an apparatus to at least perform the second method.

According to a ninth aspect of the present invention, there is provided a computer program configured to perform the first method. According to a tenth aspect of the present invention, there is provided a computer program configured to perform the second method.

EMBODIMENTS

Embodiments of the present invention relate to user-controlled access to data in a communication network. More specifically, embodiments of the present invention make it possible for a user to control who can access data of the user. The data of the user may be stored by a first network node, such as a cloud provider, but the user may monitor the access while it is ensured that a second network node, such as a data broker or a consumer, requesting the access cannot deny that it has requested the access and subsequently accessed the data of the user. In addition, it is ensured that the first network node, i.e., the network node storing the data of the user, cannot distribute the data without a permission of the user.

In some embodiments of the present invention, blockchain technology may be exploited for enabling user-controlled access to data. The second network node, i.e., the network node requesting the data of the user, may transmit a request to a user device of the user via the first network node storing the data. Upon receiving the request, the user may respond by transmitting an acknowledgement to the second network. The first and the second network nodes may, along with the user device, transmit a first indication to a blockchain after the acknowledgement. The first indication may indicate that access to the data of the user is granted, thereby enabling user-controlled access to the data of the user. For instance, if such indication is transmitted to the blockchain without a permission of the user, i.e., the user has not acknowledged the request, the user would notice that the data of the user is about to be accessed without the permission of the user.

User-controlled access to data is very important for many applications and thus, embodiments of the present invention may be exploited in various contexts. As an example, leakage of data of users may be a significant issue in case of social networks, because users may upload sensitive data, e.g., photos, to a social network and believe that only trusted persons can see the uploaded sensitive data. Also, there may be websites that have other third party applications/services running and granting access to sensitive data of users.

Moreover, sensitive data of users may be stored in cellular communication networks, such as in networks operating in accordance with Long Term Evolution, LTE, or 5G standards. Since its inception, LTE has been widely deployed and 3rd Generation Partnership Project, 3GPP, still develops LTE. Similarly, 3GPP also develops standards for 5G, such as New Radio, NR and further developments. So there are various scenarios, wherein users would like to keep sensitive data as private. Hence there is a need to ensure that access to such data can be controlled by users. Embodiments of the present invention enable user-controlled access to data by exploiting blockchain technology.

In general, blockchains may be applied for recording transactions without relying to a centralized element. Changes in resource ownership in a blockchain network take the form of blockchain transactions secured by strong cryptography. Information provided in a blockchain transaction may be stored as a new block in the blockchain in response to validation of the respective blockchain transactions. Blockchain state information shared by the nodes may store all transactions and history carried out in the blockchain network. Application of blockchain technology may enable a way to track the unique history of transactions by the individual nodes in the network. Modifying transaction data stored in a blockchain is very difficult, since as the chain lengthens, the data is left ever deeper in the blockchain. Blockchains may be used to provide a completely auditable log that includes every single transaction ever done in a blockchain network, which may be very useful in a number of use cases.

Figure 1:
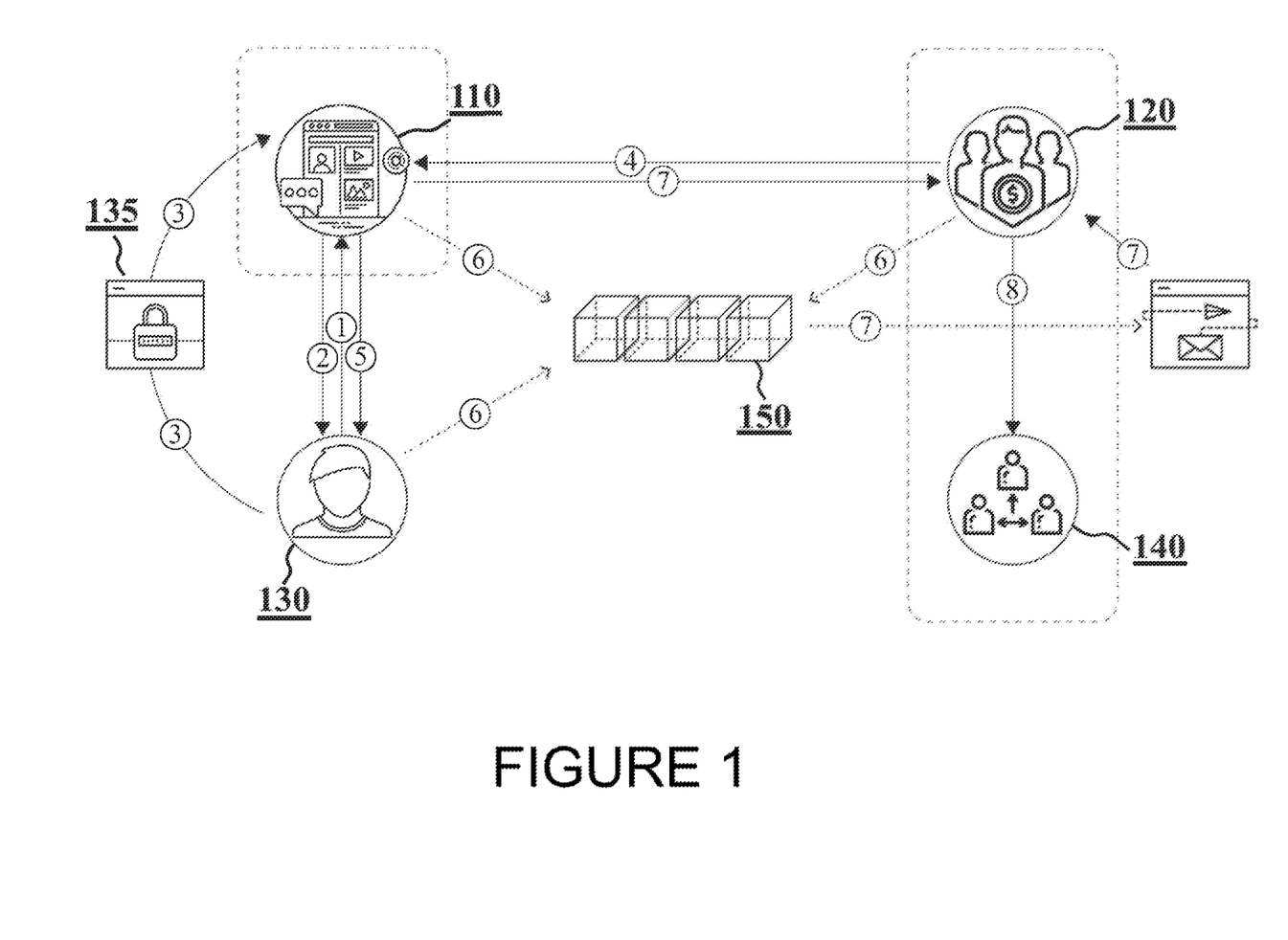
FIG. 1 illustrates a network scenario in accordance with at least some embodiments of the present invention.

FIG. 1 illustrates a network scenario in accordance with at least some embodiments of the present invention. As shown in FIG. 1, the network scenario may comprise first network node 110, such as a cloud provider or a service provider in general, second network node(s) 120, such as a data broker. In addition, the network scenario may comprise user device 130, such as, for example, a user equipment, mobile phone, tablet, a personal computer or any other user device. In some embodiments, server 135 may be located in between first network node 110 and user device 130. As shown in FIG. 1, the network scenario may also comprise third network node(s) 140, i.e., third parties.

User of user device 130 may own data and the data of the user may be encrypted and stored by first network node 110, e.g., the cloud or the service provider. As an example, the data may be photos and user, for example a Facebook user, may upload the photos to a user account, such as a Facebook account of the user at the service provider. Thus, first network node 110 may be a party that provides the service of storing the data of the user and third parties 140 may like to have access to the data of a user of user device 130. Typically the user would like to control which third parties 140, if any, can access the data of the user.

In the example embodiments, communication network like telecommunications network may comprise one or more service providers to provide consumer Internet services. Alternatively, for example in case of 5G communication networks, first network node 110 may be an operator of the user, i.e., the operator may enable data communication for user device 130 of the user. In such a case, second network node(s) 120 may be other operators, service providers, partners of other operators or directly some partners. Third parties 140 may like to have access small data pieces of the user, such as location, billing information and/or data connection setup. For the user it may beneficial to let at least some third parties 140 to have access to the data of the user, e.g., to the location of the user, to enable localized services but it may not be desirable to let everyone know where the user travels. Access request may relate to user's images stored during travelling, for example.

First network node 110 may be connected, at least temporarily, to user device 130. First network node 110 may also be connected, at least temporarily, to second network node(s) 120. Second network node(s) 120 may be further connected, at least temporarily, to third network node(s) 140. First network node 110 may be a party hosting, i.e., storing the data of the user of user device 130 and second network node(s) 120 may be parties willing to have access the data of the user, possibly for third network node(s) 140.

First network node 110, second network node 120 and user device 130 may be participants in blockchain 150. That is to say, first network node 110, second network node 120 and user device 130 may be able to transmit, i.e., write, information to blockchain 150. Also, first network node 110, second network node 120 and user device 130 may be able to receive, i.e., read, information from blockchain 150. In FIG. 1, transmissions to blockchain 150 are shown by dashed lines and direct communications are shown by solid lines.

In some embodiments, blockchain technology may be used to track all requests sent to user, such as the user of user device 130, and data shared among the participants. Moreover, multisignature transactions, i.e., wallets, associated with blockchain 150 may be exploited as well. In general, multisignature transactions require more than one signing key to authorize a transaction. Multisignature transactions may be referred to as n-of-m transactions, wherein n is the minimum number of signing keys, out of m signing keys, which are needed for confirming that a transaction is valid. That is to say, a valid transaction needs to be signed using at least n signing keys.

Moreover, multisignature transactions may be associated with a multisignature channel, i.e., a multisignature account. The multisignature channel may refer to blockchain addresses and in some embodiments of the present invention, participants of the multisignature channel, such as first network node 110, second network node 120 and user device 130 may need to sign transactions on the multisignature channel before such transactions may be transmitted, i.e., written to blockchain 150. That is to say, the multisignature channel may refer to a private channel between first network node 110, second network node 120 and user device 130. Multisignature transaction may be referred to as a status of a multisignature channel as well.

In some embodiments, a Secure Secret Sharing, SSS, scheme may be exploited. The SSS scheme may be referred to as a cryptographic protocol that enables sharing of a valuable secret between different stakeholders. Each stakeholder may obtain only a portion of the secret, i.e., a share, and it may be impossible to retrieve the full secret using only one portion of the secret. The SSS scheme may be utilized so that first network node 110 may share a private key with the user of user device 130, and possibly with second network node(s) 120 as well. Moreover, in some embodiments, The SSS scheme may be based on the Chinese Remainder Theorem, CRT.

In some embodiments, a process may start, at step 1, when user device 130 may transmit to first network node 110 a request to create an account for the user of user device 130. e.g., request registering a new user to an online service such as a social network. The account may be created for the user by first network node 110 and first network node 110 may also generate at least a first and a second share of a private key associated with the account of the user. The account may be associated with, or comprise, data of the user of user device 130. For instance, if the account is a Facebook account of the user, the data of the user may comprise photos that have been uploaded to the Facebook account of the user.

Both, the first and the second share of the private key, may be required for using the private key decryption together with the public key. First network node 110 may store the first share of the private key. Then, at step 2, first network node 110 may transmit cryptographic keys, such as a public key and the second share of the private key to user device 130. The public key may be enough for encryption, but the public key and the second share of the private key may be needed, along with the first share of the private key, for accessing the data of the user, i.e., for decryption of the data of the user. That is to say, the public key and the second share of the private key may be needed, along with the first share of the private key, for decryption of the data of the user.

Upon generating its own user key, based on the public key and a password selected by the user, user device 130 may encrypt the data of the user and transmit, at step 3, the encrypted data of the user to first network node 110. In one example embodiment the user data is sent to the server or cloud of first network node and then encrypted there.

At step 4, second network node 120 may contact first network node 110 and request access to the data of the user of user device 130. First network node 110 may forward the request to user device 130 at step 5.

User device 130, or the user of user device 130, may accept the request and decide to give access to the data of the user, or at least a part of the data of the user, to second network node 120. User device 130 may hence transmit an acknowledgement to second network node 120 via first network node 110, the acknowledgement indicating that access to the data of the user is granted. After the acknowledgement, second network node 120 is allowed to access the data of the user without violating any privacy policy. At step 6, first network node 110 may transmit the first share of the private key to second network node 120 and user device 130 may transmit the second share of the private key to second network node 120 as well.

All the participants, such as first network node 110, second network node 120 and user device 130 may communicate with each other when exchanging shares and after each share exchange, or any other communication between the participants, the multisignature channel, i.e., wallet, may be used to keep track of the communication. For instance, all the participants may be required to record on blockchain 150 via the multisignature channel that a communication, such as that the shares have been exchanged, has taken place. If at least one of the participants decides not to record the communication on blockchain 150, other parties may close the multisignature channel and the data of the user may be re-encrypted to avoid access to the data.

Upon reception of the first and the second shares of the private key, second network node 120 may, at step 7, access, i.e., retrieve, and decrypt the data of the user using the first and the second shares of the private key and the public key. The first and the second shares of the private key may be combined to get the encryption/decryption for the data of the user. In some embodiments, second network node 120 may, at step 8, forward the decrypted data of the user to third network node(s) 140, i.e., to third parties.

Figure 2:
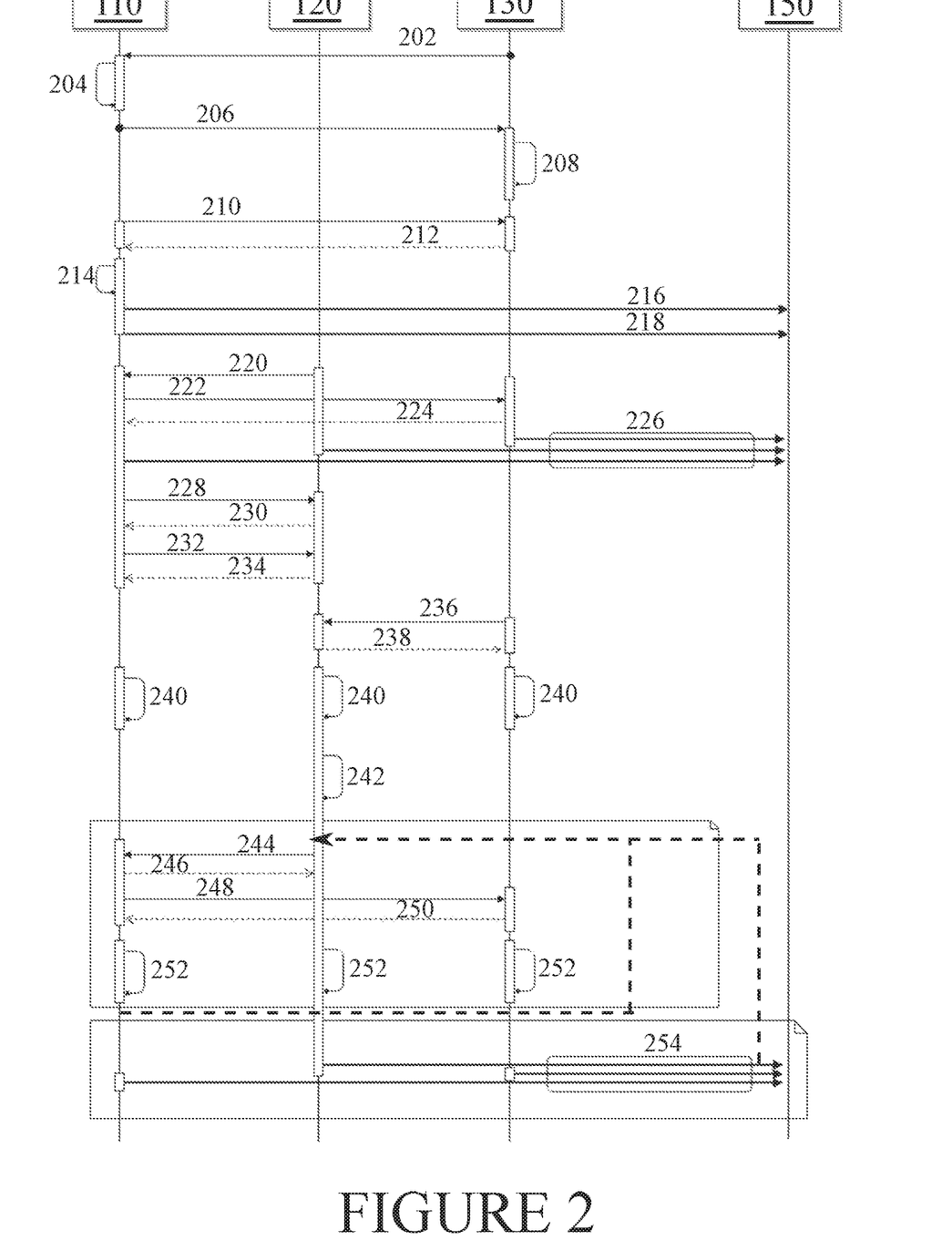
FIG. 2 illustrates a signalling diagram in accordance with at least some embodiments of the present invention.

FIG. 2 illustrates a signalling diagram in accordance with at least some embodiments of the present invention. On the vertical axes are disposed, from the left to the right, first network node 110, second network node 120, user device 130 and blockchain 150 of FIG. 1. Time advances from the top toward the bottom.

In the beginning of the process of FIG. 2, user device 110 may transmit, at step 202, a request to create an account for a user of user device 110. The account may be an online account, such as a Facebook account. At step 204, first network node 110 may create, in response to receiving the request, the account for the user of device 110. Also, first network node 110 may create a pair of a private and a public key for the account of the user, i.e., for the data of the user. In some embodiments, the private key and the public key may be assigned to the user using an identity of the user. First network node 110 may also calculate a hash value for the private key and a hash value for the public key.

At step 204, first network node 110 may also create shares. First network node may define a moduli-set required by the CRT-SSS (relatively co-prime integers) and create at least a first share of the private key and a second share of the private key. The first and the second shares of the private key may be associated with the account of the user. In some embodiments, first network node 110 may store the first share of the private key. In some embodiments, first network node 110 may also create as many shares for second network node(s) 120 as needed at step 204, such as at least one third share of the private key, depending on the number of second network node(s) 120 and the used SSS scheme. Then, first network node 110 may share the shares for second network node(s) 120 in response to receiving a request.

In some embodiments, the public key may be kept online. Alternatively, the public key may be transmitted to user device 130, i.e., user device 130 may download the public key, at step 206. A passcode may be set by the user as well. At step 208, a user key may be generated by user device 130 by encrypting the password, or passcode, with the public key. User device 130 may encrypt the data of the user using the user key and store the encrypted data of the user online, e.g., by transmitting the encrypted data of the user to first network node 110. Thus, first network node 110 may store the encrypted data of the user.

At step 210, first network node 110 may transmit the second share of the private key to user device 130. In some embodiments, first network node 110 may also transmit a hash of the second share and/or an identity of the user to user device 130. In response to receiving the second share of the private key, and possibly the hash of the second share and/or the identity of the user, user device 130 may have to transmit, at step 212, an acknowledgement indicating reception of the second share of the private key. The acknowledgement may also indicate reception of the hash of the second share and/or the identity of the user as well. In some embodiments, it may be mandatory for user device 130 to transmit an acknowledgement indicating reception of the second share of the private key, and possibly the hash of the second share and/or the identity of the user as well, thereby preventing user device 130 from disputing reception of the second share of the private key. Moreover, user device 130, or the user of user device 130, may prove that user device 130 has received the second share in case first network node 110 denies sending the second share of the private key.

At step 214, first network node 110 may, upon receiving the acknowledgement indicating reception of the second share, delete the private key. First network node may delete the public key as well. Consequently, first network node 110 may transmit, at step 216, an indication about deletion of the private key and the public key to blockchain 150, possibly along with the identity of the user. Therefore, the burden of first network node 110 may be eased, because first network node 110 does not need to hold the private key nor the public key for long. Also, it is ensured that first network node 110 cannot bypass the system and grant access to the data of the user to second network node(s) 120 without the permission of the user. In some embodiments, hashes of the private and the public key may be transmitted to blockchain 150 at step 216 as well.

At step 218, first network node 110 may transmit an indication about the account of the user, i.e., new encrypted account, to blockchain 150. The indication about the account of the user may be transmitted along with the identity of the user, possibly comprising the acknowledgement indicating reception of the second share of the private key received from user device 130 at step 212.

At step 220, second network node 120 may transmit a request to access the data of the user to first network node 110. Upon reception of the request, first network node 110 may, at step 222, forward the request to user device 130. User device 130, i.e., the user of user device 130, may agree to let second network node 120 to access the data of the user. Thus, user device 130 may transmit to first network node 110, at step 224, an acknowledgment indicating that access to the data of the user is granted for second network node 120. In some embodiments, first network node 110 may forward the acknowledgement to second network node 120.

Then, all participants of the multisignature channel, i.e., first network node 110, second network node 120 and user device 130, may participate in creation of a multisignature channel. The multisignature account may be associated with blockchain 150. For example, status updates of the multisignature channel, i.e., multisignature transactions, may be transmitted to blockchain 150, even though the multisignature channel is not a part of blockchain 150 as such. The multisignature channel may be referred to as a private channel as well. Thus, first network node 110, second network node 120 and user device 130 may start communicating off-chain, i.e., privately, so that each new status on the multisignature channel needs to be signed by each of first network node 110, second network node 120 and user device 130 before the new status is transmitted to blockchain 150.

In general, a status of the multisignature channel may comprise information about who accesses the data of the user, when the data of the user was accessed and what was the data of the user that was accessed. Thus, the multisignature channel may be used to keep track of interactions among the parties and about usage of the data of the user as well.

The use of the multisignature channel provides various benefits. As the multisignature channel requires signatures of all participants of the multisignature channel, i.e., first network node 110, second network node 120 and user device 130, it is not possible to create a new status of the multisignature channel if all the participants do not sign the new status. That is to say, all the participants of the multisignature channel need to agree with the new status. If one participant updates blockchain 150 with an old or false status of the multisignature channel, anybody who has participated in the multisignature channel may publish the latest signed status. Thus, all previous statuses of the multisignature channel, published on blockchain 150, may be overridden with the latest signed status.

Moreover, if one participant of the multisignature channel stops signing new statuses, such as new data access requests, access to the data of the user may immediately and automatically end. For instance, new data requests signed by second network nodes may not be accepted by first network node 110 or user device 130, and hence not legitimately written to blockchain 150.

Also, as soon as access to the data of the user is no more required, the current status as well as all actions that drove to the current status, i.e., all previous actions, may be transmitted to blockchain 150 as a status of the multisignature channel, thereby making the current status as well as all actions that drove to the current status public. After termination of the access, the user, i.e., user device 130, may contact first network node 110 again and request new cryptographic keys, if the user wants to make the data of the user private again. Otherwise the data of the user would remain unlocked as second network node 120 has all the required keys for decrypting the data of the user, exposing the user to data leakage and privacy violation.

Upon creation of the multisignature channel, first network node 110 may transmit, at step 228, the first share of the private key associated with the account of the user to second network node 120, possibly along with the identity of the user and/or a hash of the first share of the private key. Second network node 120 may, at step 230, acknowledge reception of the first share of the private key by transmitting an acknowledgement indicating reception of the first share of the private key. The acknowledgement indicating reception of the first share of the private key may comprise the identity of the user, a hash of the first share and/or a hash of the first share signed by second network node 120.

At step 232, first network node 110 may transmit the moduli-set, possibly comprising a nonce, to second network node 120. In response, second network node 120 may transmit, at step 234, an acknowledgement indicating reception of the moduli-set. The acknowledgement indicating reception of the moduli-set may be signed by second network node 120 as well.

At step 236, user device 130 may transmit the second share of the private key associated with the account of the user, possibly along with a nonce. In response, second network node 120 may transmit, at step 238, an acknowledgement indicating reception of the second share. The acknowledgement indicating reception of the second share may be signed by second network node 120 as well.

Thus, first network node 110 and user device 130 may exchange the first and the second shares of the private key, respectively, with second network node 120 at steps 228-238. Exchange of the shares of the private key may be recorded at step 240. All participants of the multisignature channel, i.e., first network node 110, second network node 120 and user device 130, may sign a new status of the multisignature channel at step 240, the new status of the multisignature channel comprising information indicating the shares have been shared with second network node 120.

At step 242, second network node 120 may access the data of the user by using the first and the second share of the private key. Second network node may reconstruct the private key by combining the first and the second shares of the private key and then reconstruct the password based on the reconstructed private key and the user key. The user key may be referred to as an encryption/decryption key as well. Thus, second network node 120 may access, i.e., retrieve the data of the user, e.g., from first network node 110, using the reconstructed password and an identity of the user. The password may be a password for file encryption, but not an account password. Hence, a user can have one or more passwords, ranging from a single password for each file or picture to a single password for the whole account. Thus, in some embodiments, the password may not be used for accessing the account, e.g., to post new data, but only to get access to the data of the user.

In some embodiments, second network node 120 may desire to perform multiple read and/or write operations, i.e., receive and/or transmit data, associated with the data of the user. In such a case, second network node may transmit, at step 244, a proposal for a data action to first network node 110 along with an identity of the data action. In response to receiving the proposal for the data action, first network node 110 may, at step 246, transmit an acknowledgement along with the identity of the data action, the acknowledgement indicating approval of the proposal for the data action. In addition, first network node 110 may, at step 248, forward the proposal for the data action to user device 130 along with the identity of the data action. In response to receiving the forwarded proposal for the data action, user device 130 may, at step 250, transmit an acknowledgement to first network node 110, along with the identity of the data action, the acknowledgement indicating approval of the proposal for the data action.

At step 252, all the participants of the multisignature channel, i.e., first network node 110, second network node 120 and user device 130, may update the status of the multisignature channel by signing a new status, the new status indicating that the proposal for the action has been approved by first network node 110 and user device 130. After step 252, the process may loop back to step 244, wherein second network node 120 may determine that it would like to propose a new data action. Alternatively, the process may proceed to step 254, wherein all the participants of the multisignature channel may report the current status of the multisignature channel to blockchain 150. That is to say, the current status may be published to blockchain as a status that has been signed by all the participants. The process may then loop back to step 244, wherein second network node 120 may determine that it would like to propose a new data action.

Alternatively, all the participants of the multisignature channel may determine that access to the data of the user is terminated. After the determination all the participants may transmit a second indication to blockchain, the second indication indicating that access to the data of the user is terminated. For instance, the access to the data of the user may be terminated if second network node 120 does not need the access anymore. Thus, at step 254, it may be published that that access to the data of the user is terminated by transmitting the second indication to blockchain 150.

It should be noted that in case of steps 228-252 all the transmitted messages may be kept off blockchain 150, i.e., said messages are not transmitted to blockchain 150. Instead, the messages transmitted at steps 228-238 and 244-250 may be transmitted directly between first network node 110, second network node 120 and user device 130, while the updating of the multisignature account, i.e., multisignature channel, comprises transmitting messages to the multisignature channel at steps 240 and 252.

The multisignature channel may refer to a state wherein a part of blockchain 150 is locked, and each participant of the multisignature channel, such as first network node 110, second network node 120 and user device 130, must completely agree with each other about a status of the multisignature channel to be able to update the multisignature channel. Within the multisignature channel, the participants of the multisignature channel may update the status of the multisignature channel among themselves at step 252 as the access to the data of the user proceeds. At step 252, the participants of the multisignature channel may construct and sign statuses that could be submitted to blockchain 150, but the participants may decide not to transmit the constructed and signed statuses to blockchain at step 252. That is to say, the participants may decide to hold the constructed and signed status off blockchain 150. The participants may thus decide not to publish the constructed and signed transactions. In some embodiments, each new status update, such as a constructed and signed status, may override previous updates.

At step 254, the participants of the multisignature channel may submit a signed status of the multisignature channel to blockchain 150. In some embodiments, the participants may decide to terminate the access to the data of the user and close, or lock, the multisignature channel. Moreover, in some embodiments, the multisignature channel may be unlocked again, if needed, even in a different configuration than before.

Embodiments of the present invention therefore address various challenges and provide multiple advantages. For instance, second network node 120 cannot deny having started the access process for decryption of the data of the user, because granting of access to the data of the user is recorded to blockchain 150 at step 226. Moreover, second network node 120 cannot deny reception of the first and second share of the private key associated with the account of the user, because second network node 120 has to acknowledge reception of the shares and the reception is recorded to the multisignature channel. Second network node 120 cannot deny reception of the moduli-set either, since second network node 120 has to transmit the acknowledgement at step 234, which is then recorded to the multisignature channel as a status of the multisignature channel at step 240. Also, second network node 120 is not able to deny duration of the access to the data of the user or actions related to the access to the data of the user, because the status of the multisignature channel may be recorded to the multisignature channel at step 252.

Furthermore, first network node 110 cannot deny distribution of the first share of the private key associated with the account of the user as transmission of the first share, at step 228, because the distribution of the first share of the private key may be recorded to the multisignature channel at step 240. First network node 110 cannot deny distribution of the second share of the private key associated with the account of the user as transmission of the second share at step 210 either, as the distribution of the second share may be recorded to blockchain 150 at step 218.

In addition, first network node 110 cannot serve as a sole holder of the shares of the private key associated with the account of the user, because transmission of the second share, at step, 210, may be recorded blockchain 150, and also first network node 110 may delete the private key and the public key at step 214 and report the deletion to blockchain at step 216. User device 110 cannot deny providing, or approving, the request to access to the data of the user, received from second network node 120 via first network node 110 at step 222, either because user device may need to acknowledge the request by transmitting the acknowledgement indicating that access to the data of the user is granted and the acknowledgement may be recorded to blockchain 150 at step 226.

In some embodiments, content of blockchain may be made public while content of the multisignature channel may be private, i.e., only for the parties of the multisignature channel. Hence, all the information, such as status updates of the multisignature channel, may be revealed to the public at step 254 when the multisignature channel is closed, i.e., the access to the data of the user is terminated. On the other hand, if any of the participants of the multisignature channel, such as second network node 120 or user device 130, desires to keep the data actions private for privacy issues, a participant may wait before closing the multisignature channel, e.g., by not signing the closure of the multisignature channel.

Publicity of blockchain 150 enables trust, because for example first network node 110 may need to transmit a message to blockchain 150 about deletion of the public and the private key associated with the account of the user. Moreover, first network node 110 cannot reuse the public and private keys, because termination of the access to the data of the user may be published by transmitting the second indication to blockchain 150, the second indication indicating that access to the data of the user is terminated. Indeed, upon termination of the access to the data of the user, the user may change the password and/or request for another data encryption key from first network node 110.

Some embodiments also enable regulation of online access to the data of the user as each data action at steps 244-250 may need to be recorded to the multisignature channel and signed by all the participants of the multisignature channel. Also, the duration of the access to the data of the user may be controlled by the participants of the multisignature channel.

In some embodiments of the present invention, the SSS scheme may be employed and hence the process does not depend solely on first network node 110. Key escrow may be strengthened as well, thereby avoiding a single point of failure. At least some embodiments of the present invention therefore provide an immutable and indisputable process, hence empowering trust among the participants, such as a cloud provider and data broker(s).

Figure 3:
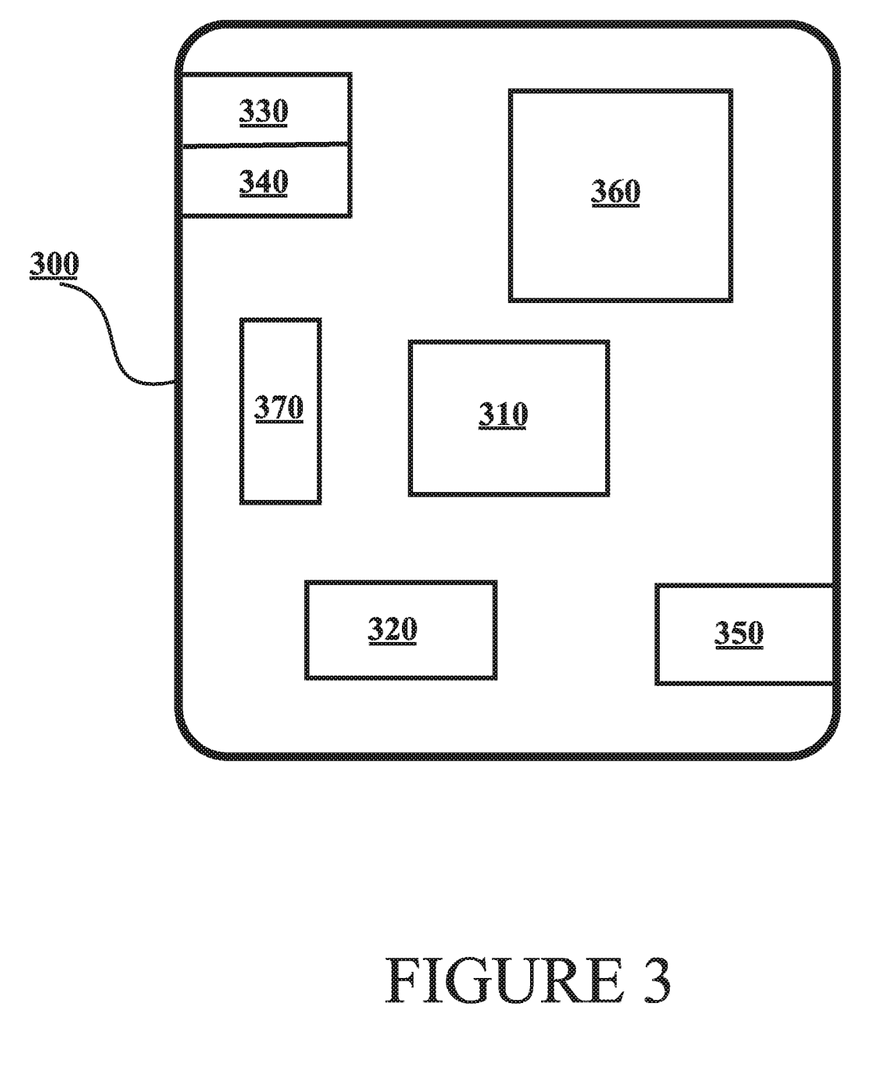
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, first network node 110 or user device 130 of FIGS. 1 and 2. Comprised in device 300 is processor 310, which may comprise, for example, a single- or multi-core processor wherein a single-core processor comprises one processing core and a multi-core processor comprises more than one processing core. Processor 310 may comprise, in general, a control device. Processor 310 may comprise more than one processor. Processor 310 may be a control device. A processing core may comprise, for example, a Cortex-A8 processing core manufactured by ARM Holdings or a Steamroller processing core produced by Advanced Micro Devices Corporation. Processor 310 may comprise at least one Qualcomm Snapdragon and/or Intel Atom processor. Processor 310 may comprise at least one Application-Specific Integrated Circuit, ASIC. Processor 310 may comprise at least one Field-Programmable Gate Array, FPGA. Processor 310 may be means for performing method steps in device 300. Processor 310 may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with Global System for Mobile communication, GSM, Wideband Code Division Multiple Access, WCDMA, Long Term Evolution, LTE, IS-95, New Radio, NR, Wireless Local Area Network, WLAN, Ethernet and/or Worldwide Interoperability for Microwave Access, WiMAX, standards, for example.

Device 300 may comprise a near-field communication, NFC, transceiver 350. NFC transceiver 350 may support at least one NFC technology, such as NFC, Bluetooth, Wibree or similar technologies.

Device 300 may comprise User Interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to accept incoming telephone calls, to originate telephone calls or video calls, to browse the Internet, to manage digital files stored in memory 320 or on a cloud accessible via transmitter 330 and receiver 340, or via NFC transceiver 350, and/or to play games.

Device 300 may comprise or be arranged to accept a user identity module 370. User identity module 370 may comprise, for example, a Subscriber Identity Module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
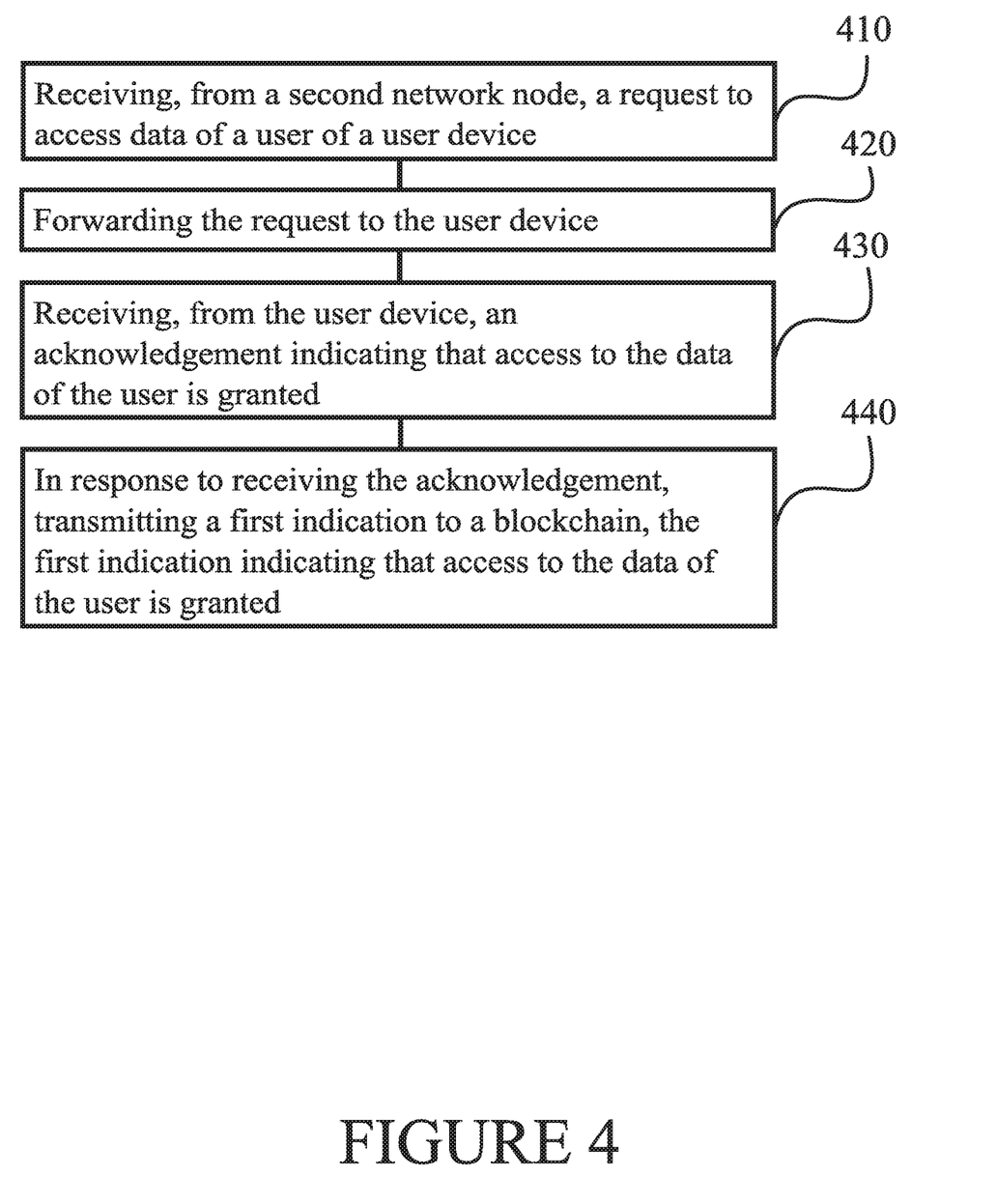
FIG. 4 illustrates a flow graph of a first method in accordance with at least some embodiments of the present invention.

FIG. 4 is a flow graph of a first method in accordance with at least some embodiments of the present invention. The phases of the illustrated method may be performed by first network node 110 or by a control device configured to control the functioning thereof, possibly when installed therein.

The method may comprise, at step 410, receiving, from a second network node, a request to access data of a user of a user device. In addition, the method may comprise, at step 420, forwarding the request to the user device. The method may also comprise, at step 430, receiving, from the user device, an acknowledgement indicating that access to the data of the user is granted. Finally, the method may comprise, at step 440, in response to receiving the acknowledgement, transmitting a first indication to a blockchain, the first indication indicating that access to the data of the user is granted.

Figure 5:
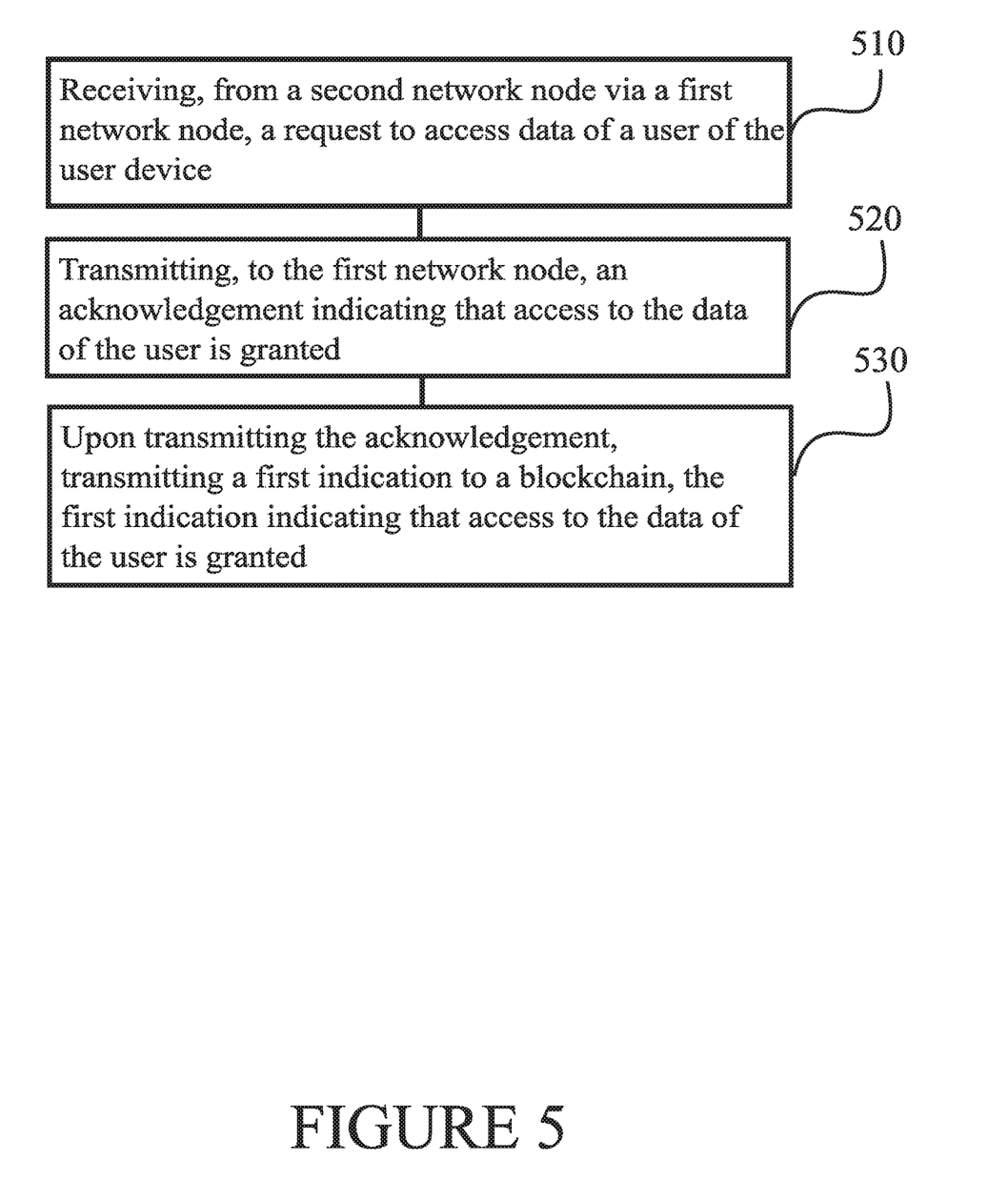
FIG. 5 illustrates a flow graph of a second method in accordance with at least some embodiments of the present invention.

FIG. 5 is a flow graph of a first method in accordance with at least some embodiments of the present invention. The phases of the illustrated method may be performed by user device 130 or by a control device configured to control the functioning thereof, possibly when installed therein.

The method may comprise, at step 510, receiving, from a second network node via a first network node, a request to access data of a user of the user device. In addition, the method may comprise, at step 520, transmitting, to the first network node, an acknowledgement indicating that access to the data of the user is granted. Finally, the method may comprise, at step 530, upon transmitting the acknowledgement, transmitting a first indication to a blockchain, the first indication indicating that access to the data of the user is granted.

User or user device may receive a request to access data of a user of the user device, from a second network node via the first network node and/or directly, the request comprising access request to the encrypted at least part of data of the user of the user device. The data or part or parts of it may be stored in the external location as for example in the first network node, or hard disk, memory stick and/or internal location as for example in the memory of the user device;

User or user device may decide either give access right or deny the access responsive to the access request.

If user or the user device provides access right by accepting the request and deciding to give access to the encrypted at least part of the data of the user, an acknowledgement indicating that access to the data of the user is granted responsive to the access request may be transmitted to the second network node.

If user denies the access request, an acknowledgment of the denial may be transmitted responsive to the access request to the second network node, the first network and/or blockchain.

Based, at least in part, on accepting the access request a first indication may be transmitted to a blockchain, the first indication indicating that access to the encrypted at least the part of data of the user is granted responsive to the access request.

Parties like the first network node, second network node and user or the user device may send their answers responsive to access requests to blockchain.

Responsive to a reception of an acknowledgment, by the user or the user device, from the blockchain comprises at least one of the following:

a first acknowledgment indicating an answer responsive to access request by the user or the user device is received by the blockchain, a second acknowledgment from the first network node, second acknowledgment comprising that the first network has received the answer by the user or the user device responsive to the access request received, and a third acknowledgment from the second network node, the third acknowledgment comprising that the third network has received the answer by the user or the user device responsive to the access request received.

Answer may comprise access rights given, or access rights denied.

Responsive to a reception of the acknowledgement from the blockchain, by the user device, in case of access rights given causing a transmission of a second share of the private key to the second network node for decrypting the encrypted at least part of data of the user.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

In an exemplary embodiment, an apparatus, such as, for example, first network node 110, second network node 120 or user device 130, may comprise means for carrying out the embodiments described above and any combination thereof.

In an exemplary embodiment, a computer program may be configured to cause a method in accordance with the embodiments described above and any combination thereof. In an exemplary embodiment, a computer program product, embodied on a non-transitory computer readable medium, may be configured to control a processor to perform a process comprising the embodiments described above and any combination thereof.

In an exemplary embodiment, an apparatus, such as, for example, first network node 110, second network node 120 or user device 130, may comprise at least one processor, and at least one memory including computer program code, wherein the at least one memory and the computer program code are configured to, with the at least one processor, cause the apparatus at least to perform the embodiments described above and any combination thereof.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in communication networks, wherein it is desirable to enable user-controlled access to data of a user. For instance, at least some embodiments of the present invention may find industrial application in social networks or in cellular communication networks, such as 5G networks.

ACRONYMS LIST

3GPP 3rd Generation Partnership Project
CRT Chinese Reminder Theorem
GSM Global System for Mobile communication
LTE Long-Term Evolution
IoT Internet of Things
NFC Near-Field Communication
NR New Radio
SIM Subscriber Identity Module
SSS Secure Secret Sharing
UI User Interface
WCDMA Wideband Code Division Multiple Access
WiMAX Worldwide Interoperability for Microwave Access
WLAN Wireless Local Area Network

| REFERENCE SIGNS LIST | |
|---|---|
| 1-8 | Steps in FIG. 1 |
| 110 | First network node, e.g., cloud provider |
| 120 | Second network node, e.g., data broker |
| 130 | User device |

-continued

| REFERENCE SIGNS LIST | |
|---|---|
| 135 | Server |
| 140 | Third network node, e.g., third party |
| 150 | Blockchain |
| 202-254 | Steps in FIG. 2 |
| 300-370 | Structure of the apparatus of FIG. 3 |
| 410-440 | Phases of the method of FIG. 4 |
| 510-530 | Phases of the method of FIG. 5 |

The invention claimed is:

1. A method for a first network node, comprising:
receiving, from a second network node, a request to access data of a user of a user device;
forwarding the request to the user device;
receiving, from the user device, an acknowledgement indicating that access to the data of the user is granted;
in response to receiving the acknowledgement, transmitting a first indication to a blockchain, the first indication indicating that access to the data of the user is granted; and
transmitting, to the second network node, a first share of a private key, comprising the first share and a second share, associated with an account of the user upon receiving the acknowledgment indicating that access to the data of the user is granted.

2. A method according to claim 1, further comprising:
creating a multisignature channel for communicating privately with the user device and the second network node upon receiving the acknowledgement indicating that access to the data of the user is granted.

3. A method according to claim 1, further comprising:
signing a new status of a multi signature channel upon transmitting the first share of the private key, the new status indicating that the first share of the private key associated with the account of the user has been transmitted to the second network node.

4. A method according to claim 1, further comprising:
determining that access to the data of the user is terminated; and
transmitting a second indication to the blockchain, the second indication indicating that access to the data of the user is terminated.

5. A method for a user device, comprising:
receiving, from a second network node via a first network node, a request to access data of a user of the user device;
transmitting, to the first network node, an acknowledgement indicating that access to the data of the user is granted;
upon transmitting the acknowledgement transmitting a first indication to a blockchain, the first indication indicating that access to the data of the user is granted; and
transmitting a second share of a private key, comprising a first share and the second share, to the second network node upon transmitting the acknowledgment indicating that access to the data of the user is granted.

6. A method according to claim 5, further comprising:
creating a multisignature channel for communicating privately with the first network node and the second network node upon transmitting the acknowledgement indicating that access to the data of the user is granted.

7. A method according to claim 5, further comprising:
signing a new status of a multi signature channel upon transmitting the second share of the private key, the new status indicating that the second share of the private key associated with the account of the user has been transmitted to the second network node.

8. A method according to claim 5, further comprising:
determining that access to the data of the user is terminated; and
transmitting a second indication to the blockchain, the second indication indicating that access to the data of the user is terminated.

9. An apparatus, comprising at least one processor and at least one memory including computer program code, the at least one memory and the computer program code configured to, with the at least one processor, cause the apparatus at least to perform:
receiving, from a second network node via a first network node, a request to access data of a user of the user device;
transmitting, to the first network node, an acknowledgement indicating that access to the data of the user is granted;
transmitting, upon transmitting the acknowledgement, a first indication to a blockchain, the first indication indicating that access to the data of the user is granted; and
transmitting a second share of a private key, comprising a first share and the second share, to the second network node upon transmitting the acknowledgment indicating that access to the data of the user is granted.

10. An apparatus according to claim 9, further comprising deciding either to give an access right or to deny the access responsive to the request.

11. An apparatus according to claim 9, further comprising creating a multisignature channel for communicating privately with the first network node and the second network node upon transmitting the acknowledgement indicating that the access to the data of the user is granted.

12. An apparatus according to claim 9, further comprising signing a new status of a multisignature channel upon transmitting the second share of the private key, the new status indicating that the second share of the private key associated with the account of the user has been transmitted to the second network node.

13. An apparatus according to claim 9, further comprising determining that access to the data of the user is terminated; and
transmitting a second indication to the blockchain, the second indication indicating that access to the data of the user is terminated.

14. An apparatus according to claim 9, wherein an acknowledgment, received by the user or the user device, from the blockchain comprises at least one of the following:
the first acknowledgment indicating an answer responsive to an access request by the user or the user device is received by the blockchain,
a second acknowledgment from the first network node, the second acknowledgment comprising that the first network has received the answer by the user or the user device responsive to the access request received, and
a third acknowledgment from the second network node, the third acknowledgment comprising that the third network has received the answer by the user or the user device responsive to the access request received.

15. An apparatus according to claim 9, further comprising, responsive to a reception of an acknowledgement from the blockchain, by the user device, in case of access rights given, causing a transmission of the second share of the private key to the second network node for decrypting encrypted data of the user.

* * * * *

UNITED STATES PATENT AND TRADEMARK OFFICE
CERTIFICATE OF CORRECTION

PATENT NO. : 11,568,083 B2
APPLICATION NO. : 16/942993
DATED : January 31, 2023
INVENTOR(S) : Matteo Signorini et al.

It is certified that error appears in the above-identified patent and that said Letters Patent is hereby corrected as shown below:

In the Claims

In Column 18, Line 52, Claim 5, delete "acknowledgement" and insert -- acknowledgement, --, therefor.

Signed and Sealed this
Twenty-ninth Day of August, 2023

*Katherine Kelly Vidal*
Katherine Kelly Vidal
*Director of the United States Patent and Trademark Office*